US012530947B1

(12) United States Patent
Jacobs

(10) Patent No.: US 12,530,947 B1
(45) Date of Patent: Jan. 20, 2026

(54) WINDOW FAN WITH SAFETY ALARM

(71) Applicant: Albatross Industry, Inc., High Point, NC (US)

(72) Inventor: Barry Jacobs, Princeton Junction, NJ (US)

(73) Assignee: Albatross Industry, Inc., High Point, NC (US)

( * ) Notice: Subject to any disclaimer, the term of this patent is extended or adjusted under 35 U.S.C. 154(b) by 0 days.

(21) Appl. No.: 18/912,747

(22) Filed: Oct. 11, 2024

(51) Int. Cl.

| | |
|---|---|
| ***F24F 7/013*** | (2006.01) |
| ***F04D 27/00*** | (2006.01) |
| ***F04D 29/52*** | (2006.01) |
| ***F24F 11/32*** | (2018.01) |
| ***F24F 11/52*** | (2018.01) |
| ***G08B 13/08*** | (2006.01) |
| ***G08B 25/00*** | (2006.01) |

(52) U.S. Cl.
CPC ............. *G08B 13/08* (2013.01); *F04D 27/00* (2013.01); *F04D 29/522* (2013.01); *F24F 7/013* (2013.01); *F24F 11/32* (2018.01); *F24F 11/52* (2018.01); *G08B 25/001* (2013.01)

(58) Field of Classification Search
CPC .. F24F 7/013; F24F 11/32; F24F 11/52; F24F 11/0001; G08B 13/08
USPC ............................................ 340/541, 545, 1
See application file for complete search history.

(56) References Cited

U.S. PATENT DOCUMENTS

| | | | | |
|---|---|---|---|---|
| 6,557,611 | B1 * | 5/2003 | Fuentes | G08B 13/08 340/545.8 |
| 7,855,641 | B1 | 12/2010 | Okafo | |
| 2011/0155365 | A1 * | 6/2011 | Wiese | F24F 11/523 165/230 |

* cited by examiner

*Primary Examiner* — Nathaniel E Wiehe
*Assistant Examiner* — Maxime M Adjagbe
(74) *Attorney, Agent, or Firm* — Princeton IP Law LLC

(57) ABSTRACT

In some embodiments, a window fan has a housing mountable in a window, the housing comprising one or more fans therein and including interior and exterior sides and a top side, the top side configured to be in touch with a window panel when the window is in a closed state. An alarm sensor is disposed on the top side of the housing and configured to detect whether the window is open. A control circuitry is provided and configured to: responsive to the alarm sensor detecting that the window is in the open state, activate an alarm output device. The control circuitry may cancel an alarm upon receiving a user command from a control panel or detecting that the alarm sensor is disengaged by a sensor stopper.

20 Claims, 9 Drawing Sheets

WINDOW FAN WITH SAFETY ALARM

FIELD

This technology relates to window fan, and more particularly to safety alarm system for a window fan.

BACKGROUND

A window fan for a home is designed to be installed in an existing window of a home. Once the window fan is installed, it requires a window panel to be partially open to make room for the window fan. As a result, the build-in window lock cannot be used. This opens the possibility that an intruder may enter the house through the unlocked window, especially when the fan is installed in the first-floor window or in a window near fire escapes, providing easy access to the intruder. As such, there is a need to detect opening of the unlocked window and send alert when intrusion is detected.

SUMMARY

The present disclosure relates to safety alarm system for a window fan that provides home security for use with the window fan. In an embodiment, the techniques provide window fan that includes: a housing mountable in a window, the housing comprising one or more fans therein and including interior and exterior sides and a top side, the top side configured to be in touch with a window panel when the window is in a closed state. The window fan further includes a control panel configured to receive user commands; an alarm sensor disposed on the housing, the alarm sensor configured to detect when the window is in the closed state or an open state; and a control circuitry coupled to the control panel, the one or more fans and the alarm sensor. The control circuitry is configured to: control operation of the one or more fans based on the received user commands; and responsive to the alarm sensor detecting that the window is in the open state, activate an alarm output device.

In an embodiments, a window fan that includes: a housing mountable in a window, the housing comprising one or more fans therein and including interior and exterior sides and a top side, the top side configured to be in touch with a window panel when the window is in a closed state. The window fan further includes: an alarm sensor disposed on the housing, the alarm sensor configured to detect when the window is in the closed state or an open state; and a control circuitry coupled to the one or more fans and the alarm sensor. The control circuitry is configured to: control operation of the one or more fans based on the received user commands; and responsive to the alarm sensor detecting that the window is in the open state, activate an alarm output device. The window fan further includes a stopper disposed on the housing and configured to disengage the alarm sensor, whereby the control circuitry deactivates the alarm output device responsive to the alarm sensor being disengaged.

BRIEF DESCRIPTION OF DRAWINGS

Additional embodiments of the disclosure, as well as features and advantages thereof, will become more apparent by reference to the description herein taken in conjunction with the accompanying drawings. The components in the figures are not necessarily to scale. Moreover, in the figures, like-referenced numerals designate corresponding parts throughout the different views.

DETAILED DESCRIPTION

Figure 1:
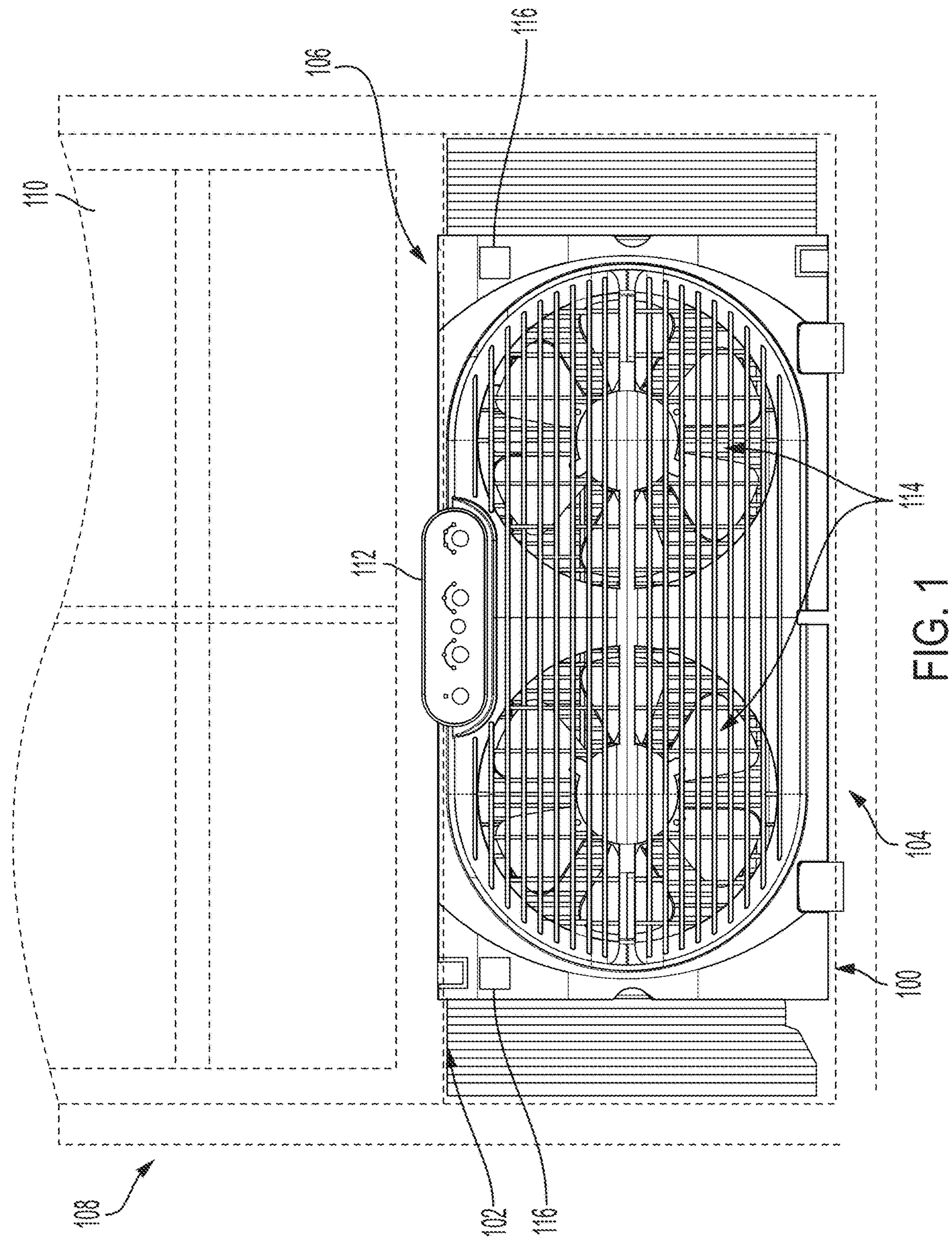
FIG. 1 is a schematic diagram of an example window fan installed in a window, according to some embodiments.

For the purposes of promoting an understanding of the principles of the present disclosure, reference will now be made to the embodiments illustrated in the drawings, and specific language will be used to describe the same. It will nevertheless be understood that no limitation of the scope of the invention is thereby intended. It should be further appreciated that the embodiments described herein may be implemented in any of numerous ways. Examples of specific implementations are provided below for illustrative purposes only. It should be appreciated that these embodiments and the features/capabilities provided may be used individually, all together, or in any combination of two or more, as aspects of the technology described herein are not limited in this respect.

For a home with a window fan installed, technical solutions are needed as to how to detect intrusions through an unlocked window. The inventors have acknowledged and appreciated that existing home security systems cannot achieve this. For example, a home security system that uses window sensors to detect opening of windows needs to bypass a particular window in which a window fan is installed because the window will always stay at an unlocked state. In other words, the home security system cannot be armed without bypassing that particular window. However, bypassing a particular window will also disable the security system from further detecting intrusions through that window, leaving the home prone to intrusions, which defeats the purpose of the home security system. Furthermore, bypassing a particular window in a security system may require a user to go through complex programming steps or even need professional help.

Other security systems use motion detection to detect intrusions into a home. For example, motion detection can be used for monitoring interior of a home when the user is away. However, motion detection for interior monitoring is often disabled when the user is at home, to prevent any false alarm due to the user's movement inside the home. Thus, when the user is at home, existing motion-based security system cannot properly detect intrusions from unlocked windows. In some existing window fans, motion sensor is installed on the window fan to detect any motion in the proximity of the window from outside. This inherits the drawbacks of any motion detection-based alarm systems in that false alarms can be triggered, especially around first floor windows near the street where pedestrians may walk by.

Accordingly, the inventors have developed a window fan with safety alarm system. FIG. 1 is a schematic diagram of an example window fan installed in a window, according to some embodiments. Window fan 100 may be installed in a window 108. For example, window fan 100 may be installed on a window sill 104, where the window panel 110 may move up and down above the window fan 100. When window sash 106 is lowered down on top of the window fan housing 102, the window is in a closed state. When the window sash 106 is lifted to leave an opening above the window fan housing, the window is in an open state.

Window fan 100 may include an alarm sensor disposed on the housing, details of which are described in FIGS. 3A-5C. The alarm sensor may be configured to detect whether the window is in the closed state or the open state. For example, alarm sensor 312 (FIG. 3A) may be a spring-loaded button. When the window sash 106 sits on the top of the window fan housing 102, alarm sensor 312 is depressed. In this state, the alarm sensor may provide a sensor signal (e.g., a high or low voltage) that indicates the window is closed. When the window sash 106 is raised, the button 312 will spring up, and provide a sensor signal (e.g., a low or high voltage) that indicates the window is open (intrusion detected).

In FIG. 1, window fan 100 may include one or more alarm output devices 116. In some examples, when the window is in the closed state, the window fan may be armed. Responsive to the alarm sensor detecting that the window is in the open state, the alarm output device may be activated to alert the residents or neighbors and also to scare off the intruders. For example, an alarm output device may include a siren or a buzzer which may emit loud sound when activated. The alarm output device may also include a light which may flash when activated. The alarm output device may be installed on interior side of the window fan (shown in FIG. 1), that when activated, alert the user inside the house. Additionally and/or alternatively, the alarm output device may be installed on exterior side of the window fan, that when activated, alert the neighbors or people passing by.

In some embodiments, responsive to the alarm sensor detecting that the window is in the open state, the window fan may be disarmed. As shown in FIG. 1, window fan 100 may include a control panel 112 (facing to interior of the home) configured to receive user commands. In some examples, responsive to the alarm sensor detecting that the window is in the open state, the user (resident) may enter a user command to disarm the alarm. As a result, the alarm output device may be deactivated (e.g., silent or off). In other examples, the disarm command may cause the alarm output device(s) to be set at a state other than on or off state. For example, when the alarm is canceled by the user, the light may turn into a steady light instead of flashing, or into a different color. This indicates that an alarm has gone off but was disarmed, indicating to the resident of the house that the system needs to be checked and reset of the alarm is needed.

In some examples, the disarm command may be a combination of one or more keys and a delayed hold, which is not apparent to an intruder. For example, pressing two keys simultaneously for 3 seconds may cancel the alarm. It is appreciated that any combination of keys on the control panel may be possible.

As shown, window fan 100 has one or more fans 114 that when operating, provide ventilation to the home. Control panel 112 may accept user commands and control operation of the fans 114. For example, the control panel may control the speed of the fan, including, for example: SLEEP-Ultra-quiet for peaceful sleep; NORMAL-Quiet, comfortable airflow; and TURBO-Extra high airflow for fast cooling. In some examples, the one or more fans 114 may be electronically reversible fans, which allows inward or outward blow, or both fans may be operated to blow in opposite directions for maximum air circulation.

Control panel 112 may further include a timer, e.g., 1-hr, 2-hr, . . . 8-hr, or any suitable timing, for set-and-forget operation. Other features of the window fan 100 may include one or more of auto locking expander for fitting a variety of window sizes, removable feet for table-top use, or integral carrying handle.

Figure 2:
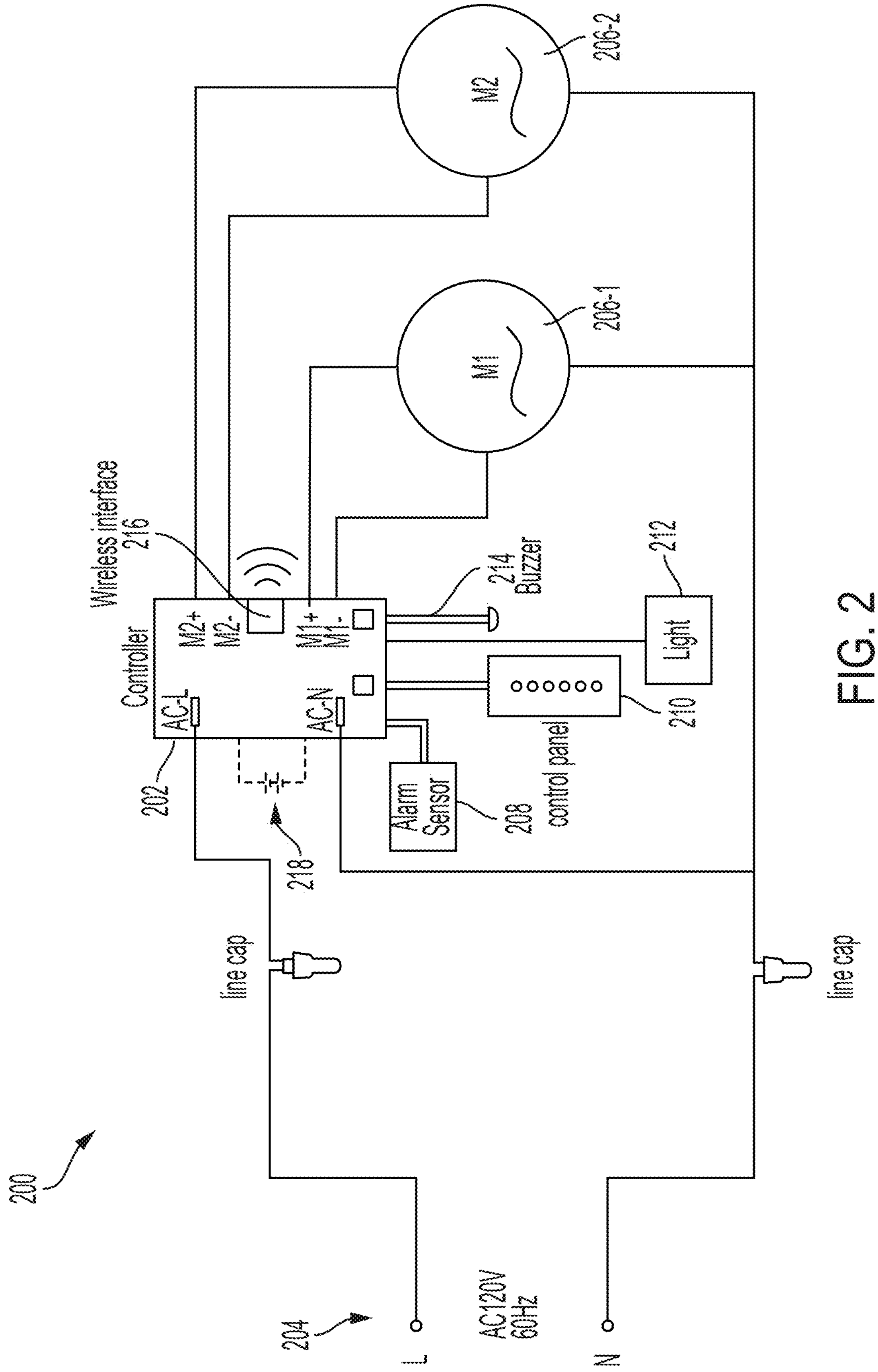
FIG. 2 is a circuit diagram of an example window fan for controlling operation of the fan and alarm system thereof, according to some embodiments.

Various controls of the window fan as described above and further herein may be provided by a control circuitry, details of which are further described in FIG. 2.

FIG. 2 is a circuit diagram of an example window fan for controlling operation of a fan, according to some embodiments. In some examples, control circuitry 200 may be provided inside the window fan 100 (FIG. 1). For example, control circuitry 200 may be provided inside the control panel. Control circuitry 200 may include a controller 202, such as a microcontroller (e.g., an integrated circuit), analog or digital circuitry on a printed circuit board (PCB), or any combination thereof. Controller 202 may be connected with a power source 204 (e.g., an AC or DC power). Controller 202 may be coupled to alarm sensor 208 to receive a sensor signal that detects whether the window is closed or open. Details of alarm sensor 208 are further provided in FIGS. 3A-5C. Controller 202 may be coupled to one or more alarm output devices (e.g., 116 in FIG. 1), such as buzzer (siren) 204, or light 212, and configured to activate the alarm output devices responsive to receiving a sensor signal that indicates that a window opening is detected.

In some embodiments, controller 202 may also be coupled to control panel 210 and configured to receive user commands from the control panel. For example, a user command may include a disarm (cancel) command, which causes controller 202 to deactivate the alarm output device (e.g., 214, 212), such as turning off buzzer 214 or light 212, or causing the alarm output device to be set at a state other than on or off, as described in FIG. 1.

In some embodiments, power source 204 may be a build-in power plug that is pluggable into any household electrical outlet. In some embodiments, control circuitry 200 may be connected to a backup power source 218, e.g., a battery, which provides power to the control circuitry when there is power outage. Alarm sensor 208 may be disposed on the window fan housing in a manner described in FIG. 1 and further herein with reference to FIGS. 3A-5C. Control panel 210 may be implemented as control panel 112 (FIG. 1). Alarm output devices, e.g., 208, 212 may be installed on interior side and/or exterior side of the window fan in a similar manner described in FIG. 1.

It is appreciated that controller 202 may be coupled to one or more fans, e.g., 206-1, 206-2, and configured to control operation of the one or more fans. In some examples, the one or more fans 206-1, 206-2 may be the one or more fans 114 in FIG. 1, and as such, controlling of the one or fans by controller 202 may be based on the received user commands from the control panel 202, in a similar manner as described in FIG. 1. Now, various configurations of alarm sensor 208 are described further in FIGS. 3A-5C.

Figure 3A:
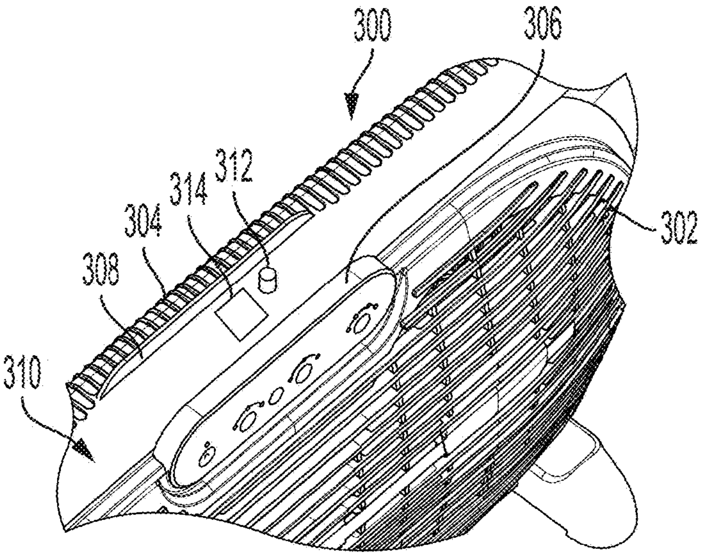
FIGS. 3A-3C illustrate various views of a window fan having an example contact window sensor installed to trigger an alarm system, according to some embodiments.
Figure 3C:
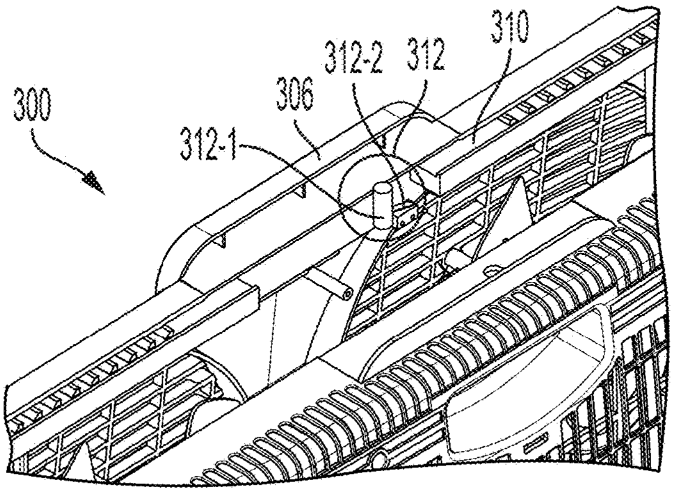
Figure 3B:
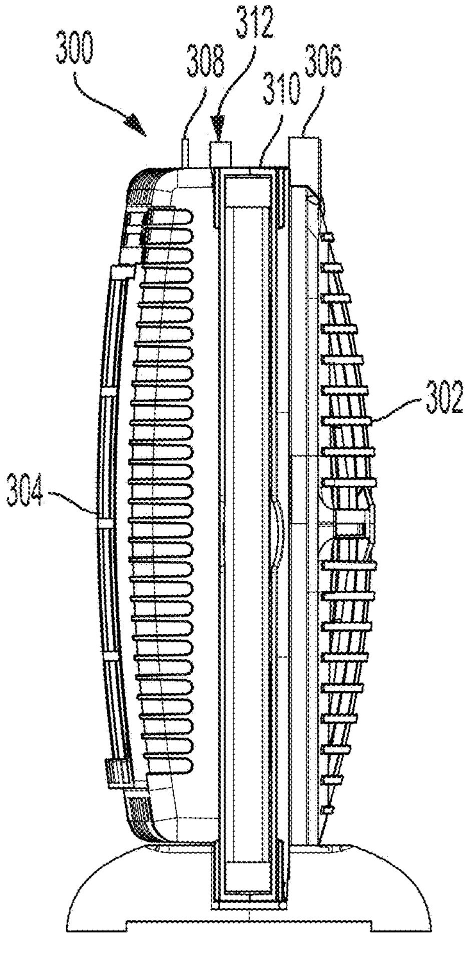

FIGS. 3A-3C illustrate various views of a window fan housing having a window sensor 312 installed to trigger an alarm system, according to some embodiments. As shown in FIGS. 3A-3C, window sensor 312 is a contact sensor installed on the top side 310 of the housing. Window sensor 312 may be positioned in an area of the top of the housing on which the bottom of the window sash (e.g., 106 in FIG. 1) will come into contact when the window sash is lowered. Contact sensor 312 may have a first position when the window panel is not in contact with the contact sensor and a second position when the window panel is in contact with the contact sensor, wherein the first and second positions respectively form an electrical path or disconnect the electrical path.

In the example shown, the window sensor 312 may be a spring-loaded button having a button 312-1 and a spring element 312-2. In FIG. 3, spring element 312-2 may be installed inside the housing 300, e.g., underneath the top of the housing 310, whereas button 312-1 may extend from the spring element up through an aperture on the top of the housing to protrude above the housing. In such configuration, when the window sash (e.g., 106 in FIG. 1) is lowered to be in contact with the top of the housing 300, button 312-1 is depressed. When the window sash is raised, button 312-1 is popped up.

Button 312-1 may be depressed or released via spring element 312-2. In a depressed state, e.g., a pushed-down position, electrical contacts of the window sensor 312 may form an electrical path including the power source (e.g., 204, 218 in FIG. 2) such that a voltage signal is provided to the controller 202 (FIG. 2). In a released state, e.g., a popped-up position, electrical contacts of the window sensor 312 may disconnect the electrical path including the power source (e.g., 204, 218 in FIG. 2) such that a low voltage (or zero voltage) is provided to the controller 202 (FIG. 2).

In the case above, a high sensor voltage at the controller may indicate that the window is closed and a low sensor voltage at the controller may indicate that the window is open. Alternatively, it is appreciated that window sensor 312 may be configured such that the pushed-down position disconnects the electrical path including the power source (thus a low voltage is provided to the controller), whereas the popped-up position forms the electrical path including the power source (thus a high voltage is provided to the controller).

The inventors have acknowledged and appreciated that the window sensor 312 (e.g., button 312-1) may be prone to tampering (access) via a gap between the bottom of the window sash and the top side of the housing. This gap may be seen from outside the window fan. Further, the gap between the bottom of the window sash and the top of the housing may tend to collect dust from the outside, causing the window sensor 312 to become sticky, restricting its movement and eventually rendering the sensor to fail.

Accordingly, in some embodiments, window fan 300 is provided with a rib 308 extending length-wise (longitudinally) along the housing. The length of the rib 308 may be the same as the length of the window fan, or smaller than the length of the window fan. Rib 308 may be positioned to be outside the window when the window is in the closed state. As shown, control panel 306 may extend upward from interior side 302 of the housing, whereas rib 308 may extend upward near exterior side 304 of the housing. As such, window sensor 312 may be installed inside a channel formed by rib 308 and back side of the control panel 306. As a result, the rib may cover a gap between the window and the top side of the housing when the window is in the closed state such that the alarm sensor is out of from sight and/or blocked from access from outside the window. Rib 308 may further prevent dust from getting into the gap between the bottom of the window sash and the top of the housing.

Figure 4A:
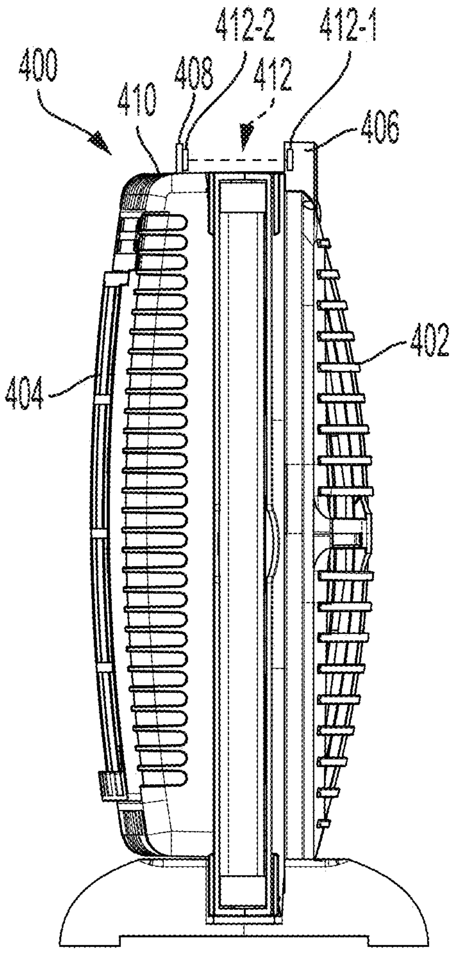
FIGS. 4A-4C illustrate various views of a window fan having an example optical window sensor installed on a window fan, according to some embodiments.
Figure 4B:
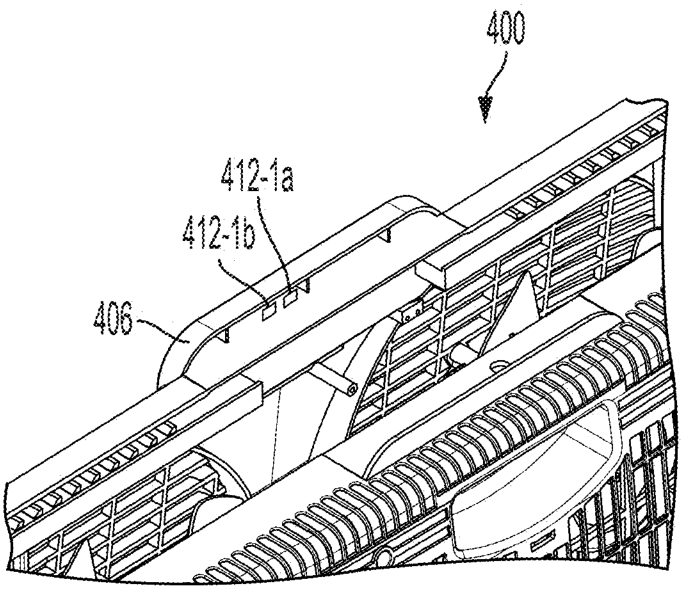
Figure 4C:
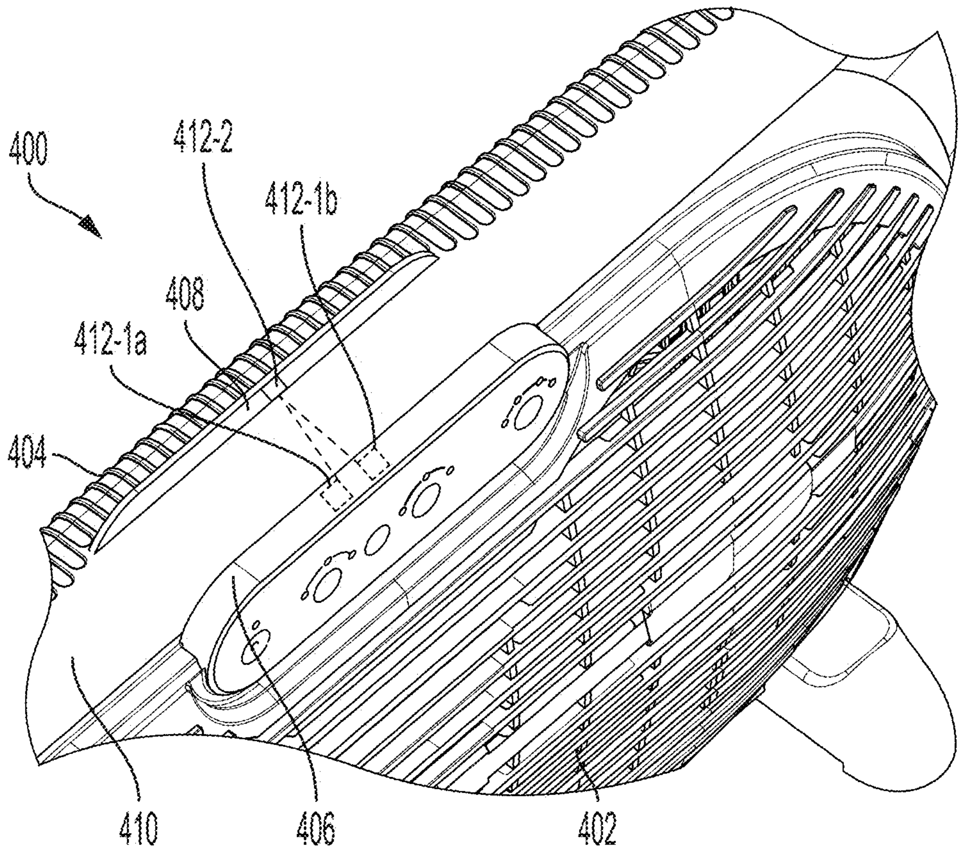

FIGS. 4A-4C illustrate various views of a window fan housing having another type of alarm sensor 412, which may be a window optical sensor, according to some embodiments. As shown, sensor 412 may include a light emitter 412-1*a* and a light receiver 412-1*b*. For example, sensor 412 is disposed inside the back side of the control panel 406, with light emitter 412-1*a* and light receiver 412-1*b* positioned next to each other and both facing the rib 408, which is configured in a similar manner as rib 308 (FIGS. 3A-3B). A reflector 412-2 (e.g., a metal plate, or a mirror plate) may be provided on the inner side of the rib 408 facing the light emitter 412-la and light receiver 412-1*b* such that light emitted from light emitter 412-la can be reflected by reflector 412-2 and received by light receiver 412-1*b*.

As shown, light sensor 412 is installed above the top 410 of the housing 400. In this configuration, when the window is in the open state, light emitted from the light emitter is received in the light receiver; and when the window is in the closed state, light emitted from the light emitter is blocked by the window sash. When light receiver 412-1*b* receives light from light emitter 412-1*a*, sensor 412 may provide a sensor signal indicating that the window is open. Otherwise, when light receiver 412-1*b* does not receive light from light emitter 412-1*a* (e.g., light path from light emitter to light receiver is blocked), sensor 412 may provide a sensor signal indicating that the window is closed.

As shown in FIGS. 4A-4C, light emitter 412-la and light receiver 412-1*b* are installed inside the window (e.g., recessed into the back side of the control panel) and the reflector 412-2 is positioned outside the window (e.g., on the inner side of rib 408). It is appreciated that other variations may be possible. For example, light emitter 412-la may be installed inside the window (e.g., recessed into the back side of control panel 406), whereas light receiver 412-1*b* may be installed outside the window (e.g., recessed into inner side of rib 408, facing control panel 406), or vice versa. In such configuration, reflector 412-2 may not be needed.

Figure 5A:
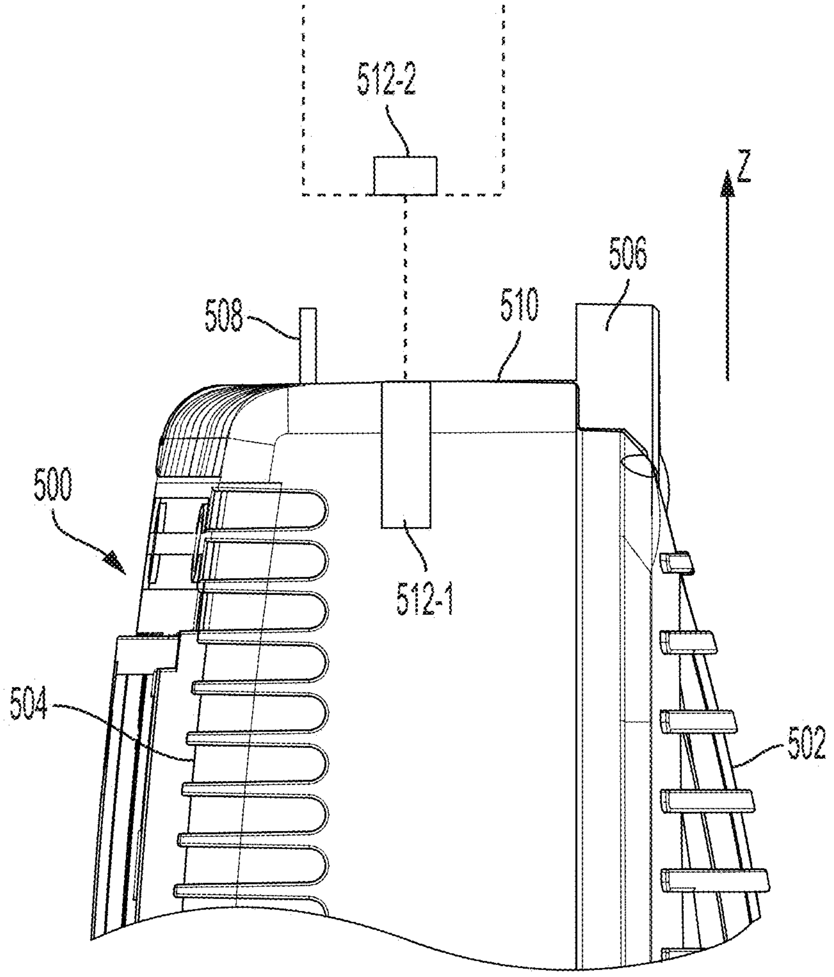
FIG. 5A illustrates an example magnetic window sensor recessed into a housing of a window fan and a magnet mounted onto the bottom of the window sash, according to some embodiments.

FIG. 5A illustrates an example alarm sensor 512 including a magnetic sensor 512-1 installed and recessed into the top side 510 of the window fan housing 500, and a magnet 512-2 mounted to the bottom of the window sash (e.g., 106 in FIG. 1). Magnetic sensor 512-1 may be configured to, when connected to a power, provide an output voltage that vary by the magnetic field around it. For example, sensor 512 may be a HALL sensor.

In FIG. 5A, magnetic sensor 512-1 and magnet 512-2 may be aligned in a vertical direction (e.g., z). When magnet 512-2 is close to (or in contact with) the magnetic sensor 512-1, a strong magnetic field may be present around the magnetic sensor, which may provide an output that is above a threshold voltage, indicating a first state indicating that the window is closed. When magnet 512-2 is away from the magnetic sensor 512-1, little or no magnetic field may be present around the magnetic sensor, which may provide an output that is below the threshold voltage, indicating a second state indicating that the window is open.

Figure 5C:
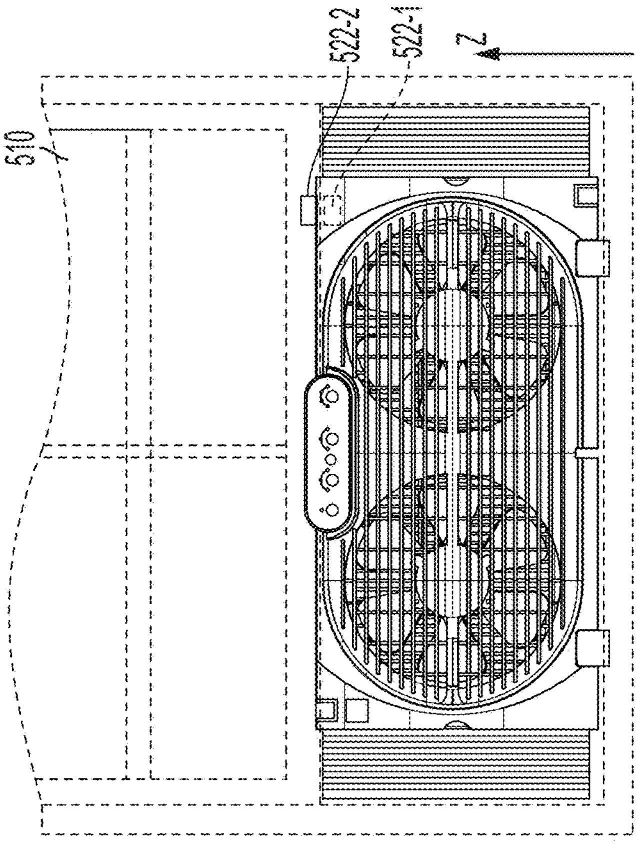
FIGS. 5B-5C illustrate various views of a window fan having an example magnetic window sensor in a variation of installation in FIG. 5A, according to some embodiments.
Figure 5B:
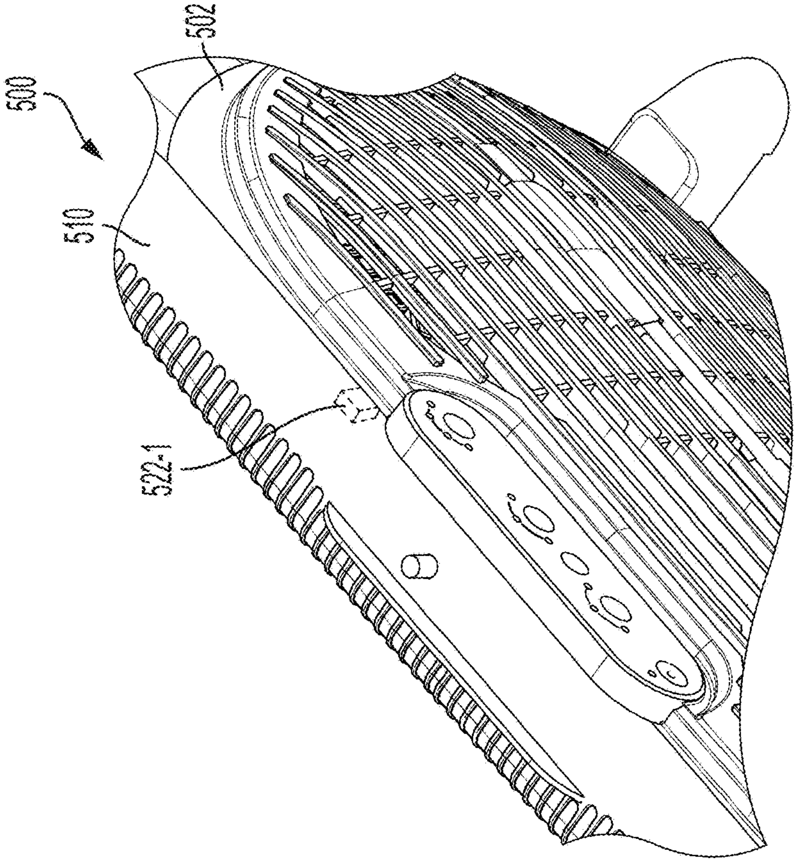

In some variations, FIGS. 5B-5C illustrate various views of a window fan housing having a magnetic sensor 522 installed at different positions. For example, magnetic sensor 522-1 may be installed and recessed into the top 510 of the housing 500 close to the interior side of the housing, whereas magnet 522-2 is attached to the side of the window sash. Magnet 522-2 may be aligned with magnetic sensor 522-1 in a vertical direction (e.g., z) in a similar manner as sensor 512 (FIG. 5A). In such configuration, when the window sash is lowered and the window is closed, magnet 522-2 is in contact with (or in a proximity of) magnetic sensor 522-1, which in turn resulted in a first state indicating that the window is closed. Conversely, when the window sash is raised and the window is open, magnet 522-2 is away from magnetic sensor 522-1, which in turn resulted in a second state indicating that the window is open.

Having described embodiments in FIGS. 1-5C, it is appreciated that variations of the embodiments described herein may be possible. For example, in FIG. 2, control circuitry 200 may further include a wireless communication interface 216 configured to, responsive to the alarm sensor detecting that the window is in the open state, transmit an alarm signal to a user device, such as an application installed on a user's smart phone.

In other variations, the safety alarm system may operate in a silent mode, in which a detection of the window open does not trigger the alarm. Instead, an alarm signal is sent to the user's device to notify the user of the "intruder" without activating the siren/buzzer or flashing the light as described above and further herein. The silent mode may be useful when the user is aware that false alarm may be present, for example, when a contractor is working on the window fan or the window in which the window fan is installed requires frequent opening and closing. In such case, the alarm output device may not be activated.

In other variations, one or more additional alarm sensors may be installed to provide added security. For example, in FIG. 3A, two window sensors like window sensor 312 are provided and positioned at a distance. In case one sensor did not detect the window opening, the other sensor may provide correct sensor signal to the control circuitry. In some examples, a combination of various types of window sensor may be used. For example, a contact window sensor (in FIGS. 3A-3C) may be installed at a first location on the housing, whereas a magnetic window sensor (in FIGS. 5A-5C) may be installed at a second location on the housing.

In other variations, when the alarm goes off, instead of user enters a disarm command using the control panel, the alarm can be turned off by the user by directly disengaging the window sensor. For example, a window sensor as described in embodiments in FIGS. 3A-5C may be provided with a sensor stopper that disengages the sensor. In response to the alarm sensor being disengaged, the control circuitry may deactivate the alarm.

The stopper may be located in a more accessible position than the control panel from both outside and inside of the house. Using the stopper may bypass the control panel when the alarm is activated, allowing the user or person entering the window to disarm more quickly and more conveniently without punching in the right combination of keys on the control panel. The stopper (e.g., the location or operation thereof) is not apparent to an intruder, preventing a stranger from operating and disengaging the alarm sensor easily. In some examples, responsive to detecting that the window is open, activation of the alarm output device may be delayed for a short period, e.g., 10 seconds, 20 seconds, 30 seconds etc., during which the alarm can be deactivated by a cancel (disarm) command from the control panel or if the alarm sensor is disengaged by the stopper.

A stopper may be provided with a window sensor that allows a user to disengage the sensor. In non-limiting examples in which a contact window sensor (e.g., FIGS. 3A-3C) is used, the stopper may include a slider plate 314 extending in the same plane of the top side of the window fan housing. The slider plate may be disposed proximate to the contact sensor 312 and configured to slide over the contact sensor to keep the contact sensor depressed. As such, the contact sensor is disengaged. In another non-limiting example in which an optical window sensor (e.g., FIGS. 4A-4C) is used, the stopper may include a lever which may be lifted and latched to block the light from the light emitter to light receiver, disengaging the sensor.

It is appreciated that the sensor stopper may be operating independent of the window sensor. For example, the stopper may be a separate button or feature that when engaged, sends a disengaging signal to the control circuitry, which causes the control circuitry to deactivate the alarm.

In other variations, the alarm system on the window fan can be disabled. For example, the control panel may receive a user command to disable the alarm. In other examples, when the alarm sensor is disengaged, window opening will not be detected, and the alarm system will be disabled.

Figure 6:
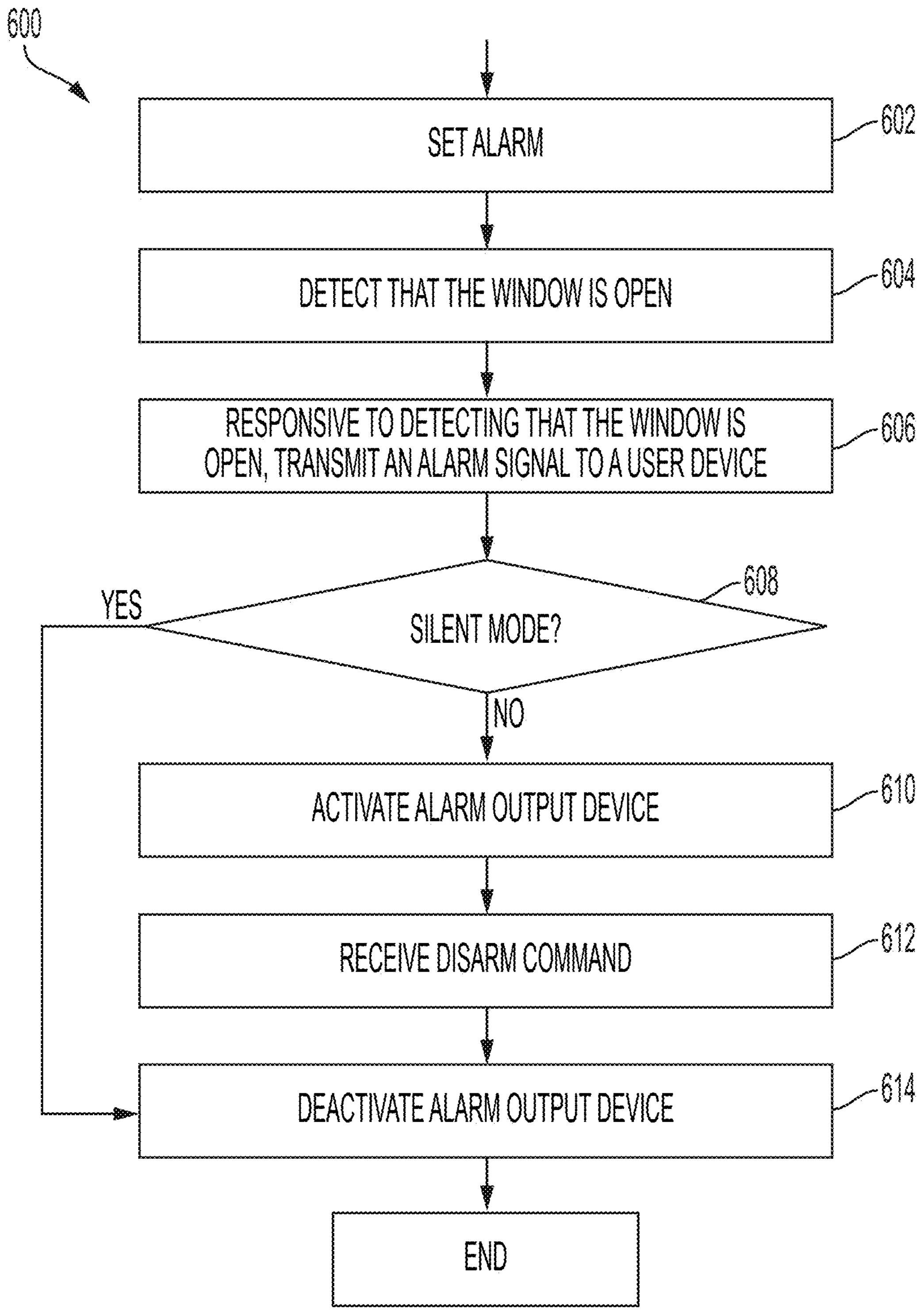
FIG. 6 is a flow diagram of an example process that can be implemented in a controller of a window fan with safety alarm, according to some embodiments.

FIG. 6 is a flow diagram of an example process 600 that can be implemented in a controller of a window fan with safety alarm, according to some embodiments. Process 600 may be implemented in controller 202 (FIG. 2), for example. Method 600 may include setting alarm, at act 602. For example, control panel (e.g., 106 in FIG. 1) may receive a user command to set the alarm. In some examples, the window fan may be in a disarmed state and the window is open (with the window sensor in a state indicating that the window is open). When the window is closed, the window sensor switches state from window open to window close, which may automatically set the alarm of the window fan.

Method 600 further includes detecting that the window is open, at act 604. For example, the alarm sensors described in embodiments in FIGS. 3A-5C may provide a sensor signal indicating whether the window is in a closed state or in an open state. Method 600 may further include: responsive to detecting that the window is open, transmitting an alarm signal to a user device, such as an alert to a smart phone, via a wireless communication interface (e.g., 216 in FIG. 2).

Method 600 may proceed to determine whether the alarm is set to a silent mode, at act 608. Silent mode can be set by the user via the control panel, for example. Alternatively, and/or additionally, silent mode can be turned on/off by an application on the user's smart phone. If the safety alarm is set to the silent mode, method 600 may proceed to deactivating the alarm output device, at act 614. Otherwise, method 600 may proceed to act 610 to activate the alarm output device such as triggering the siren or flashing light as described above. Method 600 may further include receiving a user disarm command, at act 612. For example, the user disarm command may be entered by the user via the control panel. After receiving the disarm command, method 600 may deactivate the alarm output device, act at 614.

Method 600 is only illustrative of examples of operating the alarm system of the window fan using various embodiments in FIGS. 1-5C. It is appreciated that other sequence of operations of the alarm system may also be possible. For example, silent mode may be optional. In such case, act 608 may not be needed. In other variations, wireless communication feature is optional. In such case, act 606 may be optional. In another variation, act 612 may be performed by detecting disengagement of the window sensor, e.g., by a stopper as described above, rather than the user entering a command from the control panel.

Various inventive concepts may be embodied as one or more methods, of which examples have been provided. The acts performed as part of a method may be ordered in any suitable way. Accordingly, embodiments may be constructed in which acts are performed in an order different than illustrated, which may include performing some acts simultaneously, even though shown as sequential acts in illustrative embodiments.

Various embodiments described in FIGS. 1-6 provide advantages over existing window fans in that intrusions through the window can be detected and built-in alarm can be set off to alert the resident of the home or the neighbors effectively and quickly. The built-in safety alarm of the window fan can be configured and operated by the user easily and independent of having to integrate or program any existing home security system in the home.

The indefinite articles "a" and "an," as used herein in the specification and in the claims, unless clearly indicated to the contrary, should be understood to mean "at least one." As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This allows elements to optionally be present other than the elements specifically identified within the list of elements to which the phrase "at least one" refers, whether related or unrelated to those elements specifically identified.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting.

The invention claimed is:

1. A window fan for exchanging air between indoor and outdoor, the window fan comprising:

a housing mountable in a window, the housing comprising one or more fans therein and including interior and exterior sides and a top side, the top side configured to be in touch with a window panel when the window is in a closed state;

a control panel configured to receive user commands;

an alarm sensor disposed on the housing, the alarm sensor configured to detect when the window is in the closed state or an open state; and a control circuitry coupled to the control panel, the one or more fans and the alarm sensor, the control circuitry configured to:

control operation of the one or more fans based on the received user commands; and responsive to the alarm sensor detecting that the window is in the open state, activate an alarm output device;

wherein:

the alarm sensor is a contact sensor installed on the top side of the housing, the contact sensor having a first position when the window panel is not in contact with the contact sensor and a second position when the window panel is in contact with the contact sensor, wherein the first and second positions respectively form an electrical path or disconnect the electrical path; and the housing is provided with a rib extending from the top side of the window and positioned to be outside the window when the window is in the closed state, the rib further positioned to cover a gap between the window and the top side of the housing when the window is in the closed state such that the alarm sensor is blocked from sight from outside the window.

2. The window fan of claim 1, wherein the control circuitry is further configured to, responsive to the alarm sensor detecting that the window is in the open state:

deactivate the alarm output device upon receiving a disarm command from the control panel.

3. The window fan of claim 2, wherein the disarm command is provided by the control panel in response to user pressing at least two keys on the control panel simultaneously for a period of time.

4. The window fan of claim 1, wherein the control circuitry is further configured to, responsive to the alarm sensor detecting that the window is in the open state:

detecting whether the alarm sensor is disengaged;

responsive to detecting that the alarm sensor is disengaged, deactivate the alarm output device.

5. The window fan of claim 1, wherein the first position of the contact sensor is a popped-up position and the second position of the contact sensor is a depressed position.

6. The window fan of claim 5, wherein a sensor stopper is provided and configured to keep the contact sensor in the depressed position to disengage the contact sensor.

7. The window fan of claim 1, wherein the alarm output device includes a buzzer coupled to the control circuitry and configured to go off responsive to the alarm sensor detecting that the window is in the open state.

8. The window fan of claim 1, wherein the alarm output device includes one or more lights having at least one light installed on the exterior side of the housing and configured to flash responsive to the alarm sensor detecting that the window is in the open state.

9. The window fan of claim 1 further comprising a backup battery configured to provide power to the control panel, the alarm sensor, the control circuitry and the alarm output device in presence of a power outage.

10. The window fan of claim 1, wherein the control circuitry further comprises a wireless communication interface configured to, responsive to the alarm sensor detecting that the window is in the open state, transmit an alarm signal to a user device.

11. The window fan of claim 10, wherein the control circuitry is further configured to, responsive to the alarm sensor detecting that the window is in the open state, not activate the alarm output device.

12. A window fan for exchanging air between indoor and outdoor, the window fan comprising:
- a housing mountable in a window, the housing comprising one or more fans therein and including interior and exterior sides and a top side, the top side configured to be in touch with a window panel when the window is in a closed state;
- a control panel configured to receive user commands;
- an alarm sensor disposed on the housing, the alarm sensor configured to detect when the window is in the closed state or an open state; and
- a control circuitry coupled to the control panel, the one or more fans and the alarm sensor, the control circuitry configured to:
  - control operation of the one or more fans based on the received user commands; and
  - responsive to the alarm sensor detecting that the window is in the open state, activate an alarm output device;
- wherein:
  - the alarm sensor is an optical sensor having a light emitter and a light receiver, the optical sensor disposed over the top side of the housing such that:
    - when the window is in the open state, light emitted from the light emitter is received in the light receiver; and
    - when the window is in the closed state, light emitted from the light emitter is blocked;
  - the alarm sensor further comprises a reflector configured to reflect light emitted from the light emitter to the light receiver; and
  - the light emitter and the light receiver are installed inside the window and the reflector is positioned outside the window, and the light emitter, the light receiver and the reflector are positioned such that:
    - when the window is in the open state, light from the light emitter is reflected via the reflector to the light receiver; and
    - when the window is in the closed state, light from the light emitter is blocked by the window panel.

13. The window fan of claim 12, wherein the control panel extends above the top side of the housing, wherein the light emitter and the light receiver are disposed on a back side of the control panel facing outside.

14. The window fan of claim 12, wherein the housing is provided with a rib extending from the top side of the housing and positioned to be outside the window when the window is in the closed state, wherein the reflector is provided on an inner surface of the rib facing the light emitter and the light receiver.

15. The window fan of claim 12, wherein the control circuitry is further configured to, responsive to the alarm sensor detecting that the window is in the open state:
- deactivate the alarm output device upon receiving a disarm command from the control panel.

16. The window fan of claim 12, wherein the alarm output device includes a buzzer coupled to the control circuitry and configured to go off responsive to the alarm sensor detecting that the window is in the open state.

17. The window fan of claim 12, wherein the alarm output device includes one or more lights having at least one light installed on the exterior side of the housing and configured to flash responsive to the alarm sensor detecting that the window is in the open state.

18. A window fan for exchanging air between indoor and outdoor, the window fan comprising:
- a housing mountable in a window, the housing comprising one or more fans therein and including interior and exterior sides and a top side, the top side configured to be in touch with a window panel when the window is in a closed state;
- a control panel configured to receive user commands;
- an alarm sensor disposed on the housing, the alarm sensor configured to detect when the window is in the closed state or an open state; and
- a control circuitry coupled to the control panel, the one or more fans and the alarm sensor, the control circuitry configured to:
  - control operation of the one or more fans based on the received user commands; and
  - responsive to the alarm sensor detecting that the window is in the open state, activate an alarm output device,
- wherein the alarm sensor comprises a magnetic sensor installed inside the housing proximate to the top side of the housing, and a magnet configured to be installed on the window panel to mate with the magnetic sensor, wherein a change of distance between the magnet and the magnetic sensor causes the magnetic sensor to change between an open state and a closed state.

19. The window fan of claim 18, wherein the alarm output device includes a buzzer coupled to the control circuitry and configured to go off responsive to the alarm sensor detecting that the window is in the open state.

20. The window fan of claim 18, wherein the alarm output device includes one or more lights having at least one light installed on the exterior side of the housing and configured to flash responsive to the alarm sensor detecting that the window is in the open state.

* * * * *